April 22, 1924.
H. A. CARSON
PISTON
Filed July 3, 1922
1,491,197
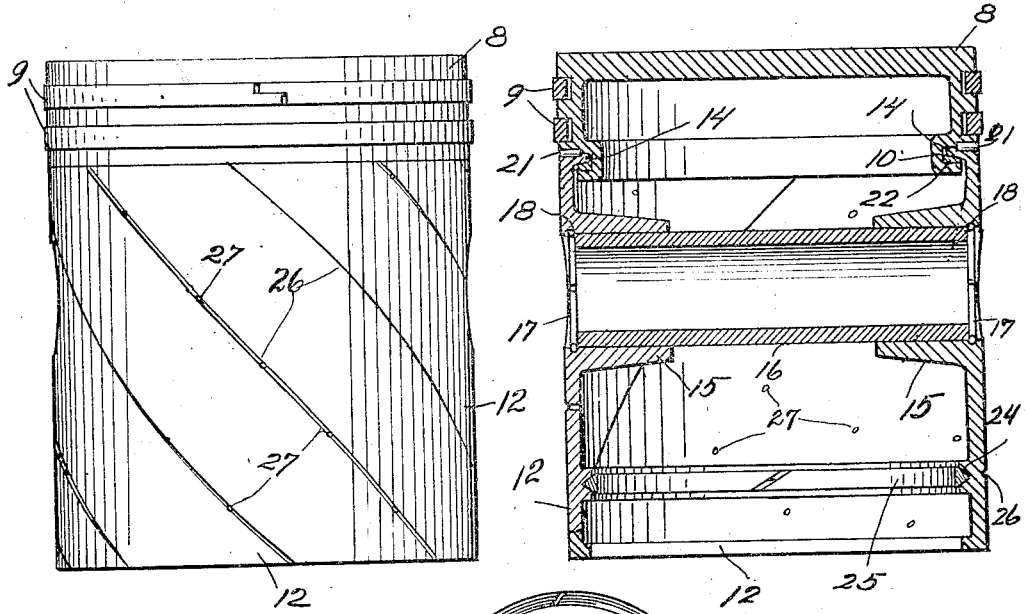
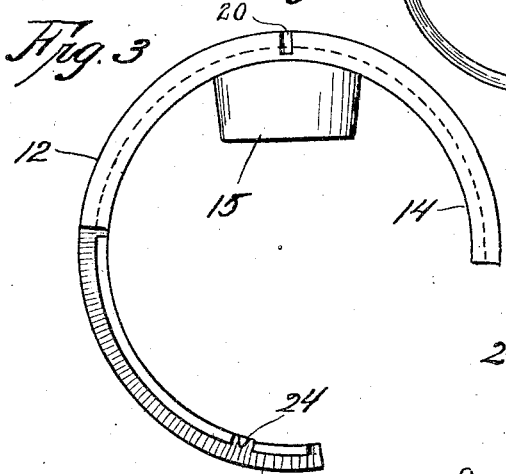
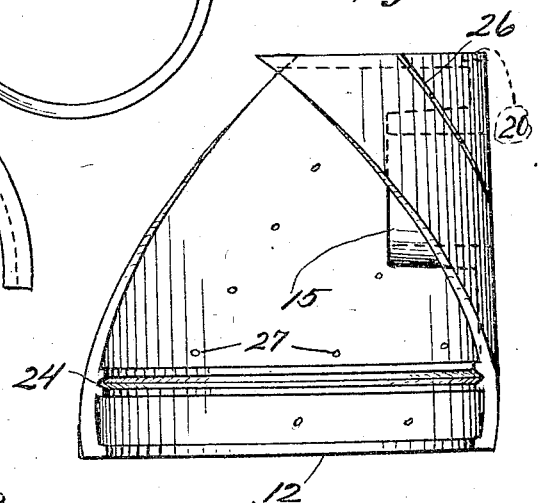
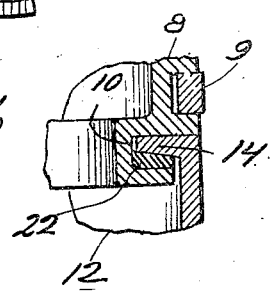
Witness:
R. E. Hamilton
Inventor,
Henry A. Carson,
By:
Thorpe & Gerard,
his Attorneys.

Patented Apr. 22, 1924.

1,491,197

UNITED STATES PATENT OFFICE.

HENRY A. CARSON, OF ST. JOSEPH, MISSOURI.

PISTON.

Application filed July 3, 1922. Serial No. 572,437.

*To all whom it may concern:*

Be it known that I, HENRY A. CARSON, a citizen of the United States, and resident of St. Joseph, county of Buchanan, State of Missouri, have invented a certain new and useful Improvement in Pistons, of which the following is a complete specification.

The present invention relates to pistons for pump and engine cylinders, and aims to provide an improved type of piston having a self-adjusting skirt portion adapted to automatically take up for wear between the piston and cylinder.

It is also an object to provide a piston structure in which the wear which takes place between its head and the cylinder walls will be caused to take place more evenly and uniformly, by the elimination of practically all cocking movement of the piston and piston rings, whereby what is known as piston slap is likewise prevented.

It is further sought to provide a construction of this character in which more efficient provision is made for lubrication of the piston and cylinder wall surfaces.

Essentially, the invention comprises a piston structure consisting of a piston head having a sectional skirt portion so constructed and assembled as to automatically take up for wear between the skirt and piston head and the cylinder walls.

With the foregoing general objects in view, the invention will now be described by reference to the accompanying drawing illustrating one form of construction which I have devised for embodying the proposed improvements, after which those features deemed to be novel will be particularly set forth and claimed.

In the drawing—

Figure 1 is a side elevation of a piston constructed in accordance with the present invention;

Figure 2 is a central sectional view of the same, taken along the axis of its wrist pin;

Figures 3 and 4 are plan and side views, respectively, of one of the sections of the piston skirt;

Figure 5 is a plan view of one of the expansion rings for the skirt sections; and Figure 6 is an enlarged detail section showing the connection between the piston head and one of the skirt sections.

Referring now to the drawing in detail, this shows a piston head member 8 provided with the usual set of packing rings 9, and its lower or outer margin formed with an exterior annular groove or channel 10 for the attachment of the skirt structure. This skirt portion I construct in a plurality of sections, the drawing showing the same made in two mating shell sections 12 of spiral or helical form, as clearly shown in Figure 4, with their upper edges provided with inwardly extending flanges 14 adapted to be received within the groove or channel 10 of the piston head. On its interior the skirt structure is formed with mating bearing bosses 15 for mounting a wrist pin or sleeve 16, retained in place by means of split expansion springs 17 fitting in shallow grooves 18, as illustrated in Figure 2. The arrangement of bosses 15 and wrist pin 16 is such as to lend the most efficient expanding effect to the skirt sections 12, that is, to permit the maximum flexibility of the skirt sections, the upper margins of which are provided, adjacent their extreme tapered ends, with recesses 20 for engagement with pins 21 similarly engaged with the head 8 and designed to prevent any bodily shifting of the skirt structure with relation to the head 8.

The flanges 14 of the skirt sections 12 have sloping under faces which engage the similarly sloping upper face of a split expansion ring 22 mounted in said groove or channel 10. This ring 22, therefore, cooperates with the flanges 14 with a wedge-like effect for not only retaining the skirt sections 12 drawn into tight fitting relation to the head 8, but also imparting a continuous expanding action to the skirt sections into proper close fitting relation to the wall of the cylinder. For producing a like expanding action at the lower portions of the skirt sections, the same are provided on their inner faces with registering V-shaped grooves 24 for receiving a split expansion ring 25 which is wedge-shape in cross section, thereby operating to maintain the skirt sections in their proper relation longitudinally, in addition to cooperating in the expanding action of the ring 22.

The exterior faces of the skirt sections 12 are formed with spaced spiral or helical grooves 26 running parallel to the side margins of the sections, and affording passages for distributing the oil used in lubricating the cylinder. I also prefer to provide a series of openings 27 at different points along the grooves 26, communicating with the interior of the piston and thus insuring an adequate supply of lubricant to the grooves.

With the improved construction, comprising the head and expansible skirt sections arranged as illustrated, it is apparent that the skirt sections will be maintained under a constant expanding pressure exerted by the rings 22 and 25, with the result that the piston skirt will be caused to hug the cylinder wall uniformly on all sides, with even and uniform pressure at all points. In addition to this, the upper ring 22, by its wedging function, maintains a tight fitting connection between the skirt sections and the piston head, thus automatically taking up any wear, and furthermore cooperates with the ring 25 to maintain the skirt sections in proper matched relation and in accurate alinement with the piston head. From this it obviously follows that there will be no cocking tendency on the part of the piston and piston rings, and that the same will be caused to wear evenly, and, since the whole piston structure is made to fit tightly within the cylinder at all times, any slapping tendency of the piston is eliminated, and the cylinder wall will be subjected to uniform wear all round. As a consequence, this also eliminates what is known as oil pumping in engine cylinders, and its attendant evils.

While I have described and illustrated what I now regard as the preferred form of construction for embodying the invention, I desire to reserve the right to make all such changes or modifications as may fairly fall within the scope of the appended claims.

What I claim is:

1. A piston construction comprising a piston head, a sectional skirt, and connecting means securing said skirt to said head, said connecting means being operative to draw said head and skirt together to take up wear between said head and skirt and simultaneously to impart an expanding action to the latter.

2. A piston construction comprising a piston head, a sectional skirt carried by said head, and an annular wedge device connecting said head and skirt and operative to draw the same continuously together to take up for wear.

3. A piston construction comprising a piston head, a sectional skirt carried by said head, said skirt and head being formed with an interengaging groove and tapered flange for suspending said skirt from said head, and an expansion ring mounted in said groove and cooperating with said flange to impart a continuous expanding action to the sections of said skirt and simultaneously to draw said skirt and head together to take up for wear.

4. A piston construction comprising a piston head, a piston skirt carried by said head and formed of a plurality of helical mating sections, the outer faces of said skirt sections being formed with lubricating grooves extending parallel to the mating edges of said sections, and means acting to impart a continuous expanding action to said skirt sections.

5. A piston construction comprising a piston head, a piston skirt carried by said head and formed of a plurality of helical mating sections, the inner faces of said skirt sections being provided with registering V-shaped grooves, and an expansion ring of tapered cross-section fitting said grooves and acting to impart continuous expanding action to said skirt sections.

In witness whereof I hereunto affix my signature.

HENRY A. CARSON.